(12) United States Patent
Tabet et al.

(10) Patent No.: US 7,883,012 B2
(45) Date of Patent: Feb. 8, 2011

(54) INTEGRATED DATA READER AND BOTTOM-OF-BASKET ITEM DETECTOR

(75) Inventors: Nicolas N. Tabet, Eugene, OR (US); Alan Christopher Bradley, Eugene, OR (US)

(73) Assignee: Datalogic Scanning, Inc., Eugene, OR (US)

( * ) Notice: Subject to any disclaimer, the term of this patent is extended or adjusted under 35 U.S.C. 154(b) by 0 days.

(21) Appl. No.: 11/582,840

(22) Filed: Oct. 17, 2006

(65) Prior Publication Data

US 2007/0084918 A1    Apr. 19, 2007

Related U.S. Application Data

(60) Provisional application No. 60/728,389, filed on Oct. 18, 2005.

(51) Int. Cl.
*G06K 15/00* (2006.01)
(52) U.S. Cl. .................... 235/383; 235/462.14
(58) Field of Classification Search ................ 235/378, 235/383, 454, 462.14, 462.41, 462.43, 462.45, 235/472.01; 705/64, 73
See application file for complete search history.

(56) References Cited

U.S. PATENT DOCUMENTS

| | | | |
|---|---|---|---|
| 3,725,894 A | 4/1973 | Geisler | |
| 4,327,819 A | 5/1982 | Coutta | |
| 4,723,118 A | 2/1988 | Hooley et al. | |
| 4,797,540 A * | 1/1989 | Kimizu | 235/383 |
| 4,868,375 A * | 9/1989 | Blanford | 235/462.15 |
| 4,990,756 A * | 2/1991 | Hoemann | 235/435 |
| 5,485,006 A * | 1/1996 | Allen et al. | 250/222.1 |
| 5,610,584 A | 3/1997 | Schrade | |
| 5,910,769 A | 6/1999 | Geisler | |
| 6,542,079 B1 | 4/2003 | Kahl, Sr. | |
| 6,601,760 B1 * | 8/2003 | Nardozzi | 235/375 |
| 6,816,608 B2 * | 11/2004 | Cato | 382/138 |
| 7,100,824 B2 | 9/2006 | Ostrowski et al. | 235/383 |
| 7,219,838 B2 * | 5/2007 | Brewster et al. | 235/383 |
| 7,246,745 B2 * | 7/2007 | Hudnut et al. | 235/383 |
| 7,527,198 B2 | 5/2009 | Salim et al. | |

(Continued)

FOREIGN PATENT DOCUMENTS

EP    0 629 370 A1    6/1993

(Continued)

OTHER PUBLICATIONS

Web Page, www.evoretail.com/lanehawk/ LaneHawk, Visual Scanner for Preventing BOB Loss, Evolution Robotics Retail, an Idealab company (Aug. 28, 2006).

(Continued)

*Primary Examiner*—Karl D. Frech
(74) *Attorney, Agent, or Firm*—Matthew D. Thayne; Stoel Rives LLP

(57) ABSTRACT

Embodiments of methods, systems, and apparatus for integrating a bottom-of-basket (BOB) item detector with a data reader. In some embodiments, the BOB item detector may be integrated with a barcode scanner of a point-of-sale (POS) terminal without need for modification of the POS system software. Some embodiments may also include a visual and/or audible indication of the presence of a bottom-of-basket item.

5 Claims, 3 Drawing Sheets

U.S. PATENT DOCUMENTS

| | | | |
|---|---|---|---|
| 2003/0136830 A1* | 7/2003 | Powell et al. | 235/381 |
| 2003/0184440 A1* | 10/2003 | Ballantyne | 340/568.5 |
| 2005/0103868 A1* | 5/2005 | Zhu et al. | 235/462.46 |
| 2005/0160050 A1* | 7/2005 | Payne | 705/64 |
| 2005/0189411 A1 | 9/2005 | Ostrowski et al. | 235/383 |
| 2005/0189412 A1 | 9/2005 | Hudnut et al. | 235/383 |
| 2006/0261157 A1 | 11/2006 | Ostrowski et al. | 235/383 |
| 2006/0283943 A1 | 12/2006 | Ostrowski et al. | 235/383 |

FOREIGN PATENT DOCUMENTS

| | | |
|---|---|---|
| EP | 0 843 293 A2 | 5/1998 |
| GB | 1 236 476 | 11/1968 |
| WO | WO 95/10212 | 4/1995 |
| WO | WO 96/01454 | 1/1996 |

OTHER PUBLICATIONS

Web Page, www.evolution.com/products/lanehawk/ LaneHawk Visual Scanner for Preventing BOB Loss, Evolution Robotics (Apr. 2, 2007).

Web Page, www.store-scan.com, Store-Scan, Inc. The Industry Leader in Bottom-of-Basket Loss Prevntion, Digital Intelligence to Reduce Bottom-of-Basket Loss Now (Aug. 28, 2006).

Extended European Search Report dated Sep. 15, 2010 in European Application No. 06817167.7.

* cited by examiner

INTEGRATED DATA READER AND BOTTOM-OF-BASKET ITEM DETECTOR

RELATED APPLICATION DATA

This application claims the benefit under 35 U.S.C. §119(e) of U.S. Provisional Patent Application No. 60/728,389, filed Oct. 18, 2005, and titled "Integrated Data Reader and Bottom-of-Basket Item Detector," hereby incorporated by reference.

BACKGROUND

The field of the present invention relates generally to item detectors, such as barcode scanners. More particularly, it relates to systems, methods, and apparatus involving the integration of bottom-of-basket item detectors with data readers or point-of-sale terminals.

Items placed on bottom shelves of shopping carts below the main basket can be problematic for retailers and customers alike. Customers often forget about such items, as they are separated from the rest of the items in the cart and are not particularly conspicuous in their location. For largely the same reasons, such items are also often not seen or recorded by cashiers. In addition, such items can be difficult and/or awkward to scan using conventional barcode scanning systems.

The present inventors have determined that it would be desirable to provide an item detector that is able to scan and detect items located on the bottom shelf of a shopping cart. Such detectors are referred to as bottom-of-basket (BOB) item detectors. BOB item detectors provide a way to ensure that items placed on shopping cart bottom shelves are always rung up and paid for at the point of sale.

The present inventors have determined that it would also be desirable to provide a BOB item detector that can be integrated with data readers (e.g., barcode scanners) already used by retailers—such as grocery stores—in their point-of-sale (POS) terminals without modification of the existing POS system software.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings in which.

DETAILED DESCRIPTION OF PREFERRED EMBODIMENTS

In the following description, numerous specific details are provided for a thorough understanding of specific preferred embodiments. However, those skilled in the art will recognize that the embodiments may be practiced without one or more of the specific details, or with other methods, components, materials, etc.

In some cases, well-known structures, materials, or operations are not shown or described in detail in order to avoid obscuring aspects of the preferred embodiments. Furthermore, the described features, structures, or characteristics may be combined in any suitable manner in one or more embodiments.

Disclosed herein are embodiments of methods, systems, and apparatus for integrating a BOB item detector with a data reader. For ease of description, certain preferred embodiments will be described with reference to a barcode scanner, but other data readers such as imaging readers (using CCD or CMOS arrays), RFID readers, and the like may also be employed. Several disclosed embodiments may therefore be used to connect BOB item detectors with existing POS terminals, without the requirement of modifying POS terminal software. By integrating the BOB item detector with the data reader, the BOB item detector may communicate with the POS through the data reader, thereby eliminating need to integrate the BOB device with each POS terminal type.

In one implementation of a method according to a preferred embodiment, a BOB item detector is provided. The BOB item detector is integrated with a barcode scanner, the scanner being attached to a POS terminal, without requiring software modification of the POS system software. BOB item detectors that may be suitable for use in connection with various embodiments disclosed herein are disclosed in U.S. patent application Publication Nos. 2005/0189411 and 2005/0189412 titled "Systems and Method for Merchandise Checkout" and "Method of Merchandising for Checkout Lanes," respectively. Both of the foregoing references are hereby incorporated by reference. The BOB item detector detects items below the main cage of a shopping cart, such as on the bottom shelf of the cart. The BOB item detector may then communicate with the barcode scanner to inform it of the specific items detected on the bottom shelf. The scanner may alert the operator and display a description(s) of the item(s), either, for example, on a terminal of a POS system or on an independent display screen integrated into the scanner itself, as further described below. The operator may then visually verify that the item(s) are on the bottom shelf and so indicate by providing feedback to the system. The BOB item detector may also provide the UPC barcode information of the item on the bottom-of-basket shelf to the POS system just as if it had been scanned by the POS barcode scanner.

Figure 1:
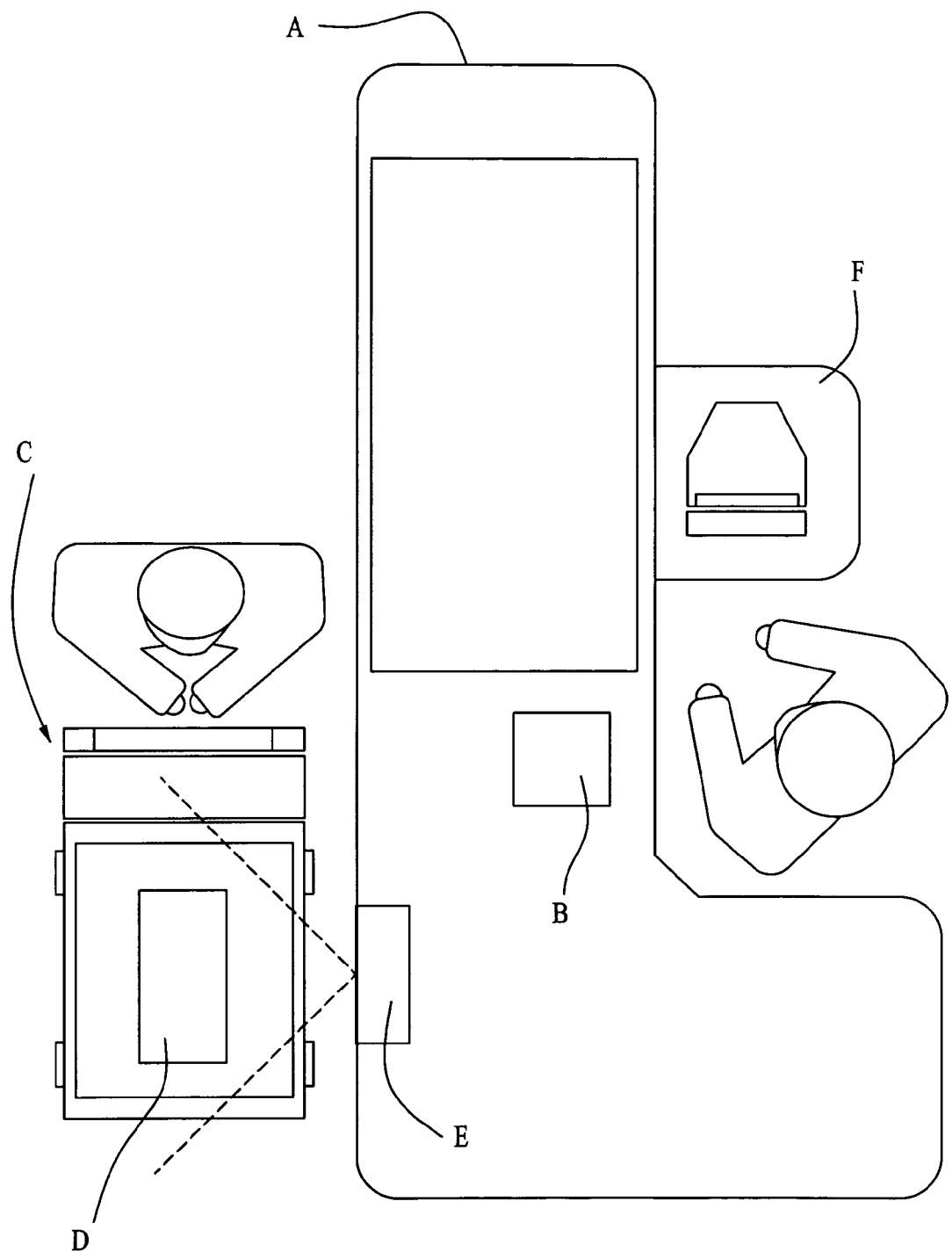
FIG. 1 illustrates an exemplary environment and elements for use in connection with certain preferred embodiments.

FIG. 1 depicts a suitable environment and exemplary elements that may be used in connection with various particular embodiments. FIG. 1 illustrates a retail establishment with a checkout lane A where items to be purchased can be scanned by a cashier at barcode scanner B. A customer's shopping cart C is shown adjacent the checkout lane A. An item D is illustrated as having been left on the bottom shelf of shopping cart C. A BOB item detector E is disposed in the checkout lane A at a suitable position and elevation to provide a field of view proximate to the location of the bottom shelf of the cart C. A POS terminal, such as a cash register F, is also located at the checkout lane A. A preferred system includes a BOB detector or other detection device that is integrated to a POS system's barcode scanner without the requirement of modifying POS terminal software, as disclosed herein. As to the construction of each of the individual elements shown in FIG. 1, further information regarding BOB devices, POS terminals, and barcode scanners can be found in U.S. patent application Publication Nos. US2005/0189411 and US2005/0189412, both of which were previously incorporated by reference.

Alternately, the integrated BOB system may be implemented in a self-checkout lane whereby the customer may scan items with a barcode scanner without the help of a cashier. For the purposes of this description, the term user or operator will be used to designate the person operating the system that would be either the cashier (or checkout clerk) in the case of a typical checkout clerk assisted checkout lane or the customer in the case of a self-checkout system.

Figure 2:
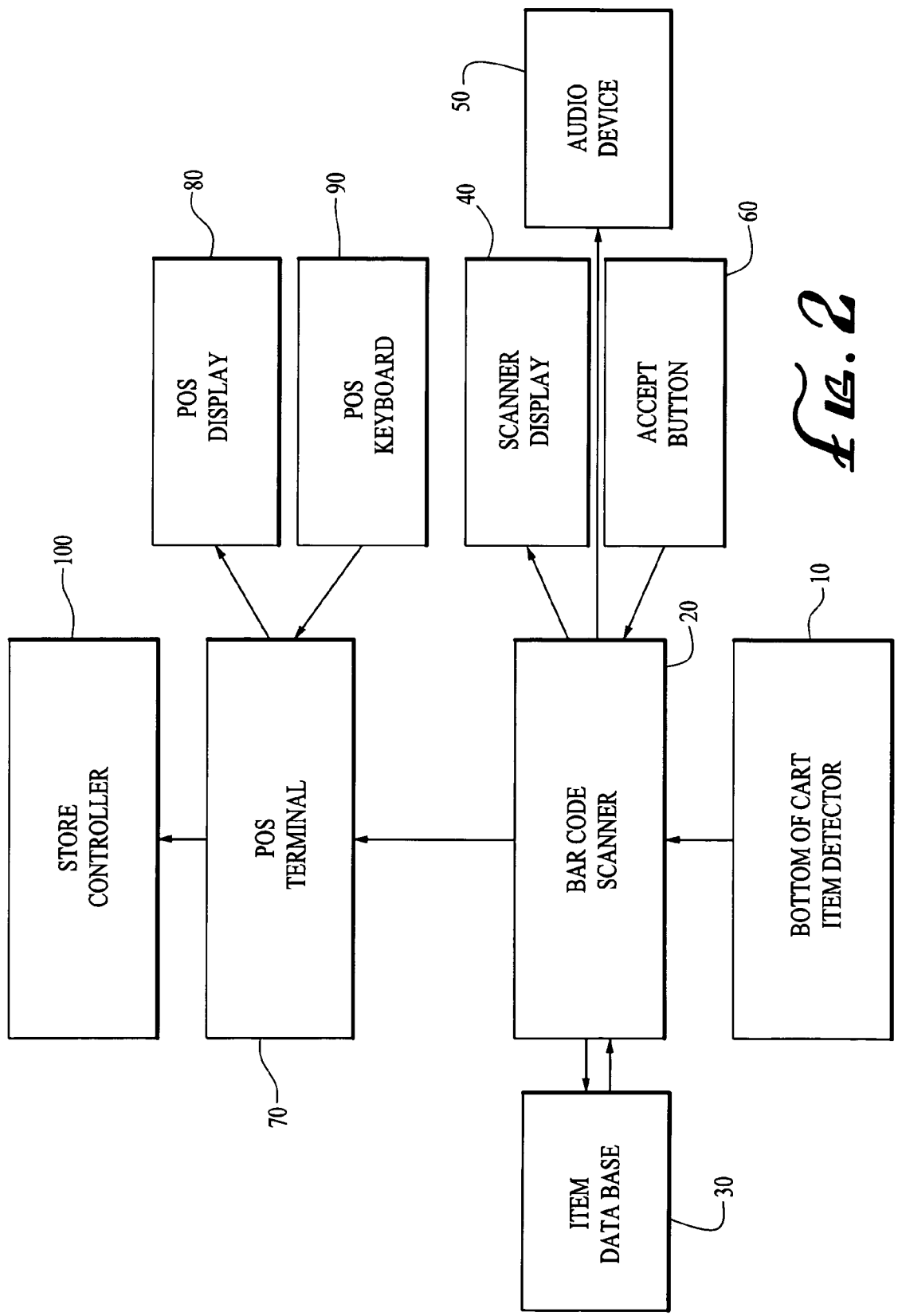
FIG. 2 is a schematic diagram illustrating the interaction between the components of one particular preferred embodiment.

FIG. 2 presents a schematic illustration of several components of one embodiment. A bottom-of-cart item detector (or "BOB detector") 10 is integrated with barcode scanner 20. BOB detector 10 detects an item in one particular region of a shopping cart (such as on the bottom shelf) and notifies barcode scanner 20. In some embodiments, the BOB item detector 10 may be mounted on a check-stand where it has a good view of the bottom shelf of each shopping cart that passes by. The BOB item detector 10 may be interfaced to barcode scanner 20 via a suitable interface, such as RS-232, USB (Universal Serial Bus), or via an ethernet connection.

Upon detection of one or more items on the bottom shelf, or other particular region, of a shopping cart, the detector 10 may then look up the detected item(s) in an item database 30. The item database 30 may be stored, for example, in the detector 10, in a controller local to the detector, in the scanner 20 itself, or centrally on a server located elsewhere in the store. Once the information associated with the detected item has been identified in database 30, that information may be sent to scanner display 40 to be displayed to the user/operator. The display 40 may be physically integrated with the scanner 20, or may be physically separate, but electrically connected, to the scanner 20. Examples of the types of information that may be transmitted to the scanner 20 include the item description, item picture, item quantity, and/or UPC number. The BOB item detector 10 may be designed to send all descriptions of items seen and accompanying information at once, or one at a time controlled by, for example, a handshake protocol with the scanner 20. Alternatively, the BOB item detector 10 may send only item identification data (e.g., image features of the item) while the description, and any other item desired information, is retrieved from the item database 30 or the like. In one preferred configuration, the BOB item detector 10 merely sends raw data to the scanner 20 and the decoder within the scanner decodes the data to acquire the UPC number(s) on the item(s) detected.

Some embodiments may include a visual sensor for capturing an image of the merchandise in a particular region of a shopping cart, such as on a bottom shelf. Such embodiments may include a subsystem for receiving visual data from the visual sensor and analyzing the visual data. The visual data may be compared with a database of items that are likely to be found on the bottom shelf of a shopping cart. The database may also include product data regarding the items in the database, such as barcode data. For items that have been recognized by the system, one or more pieces of product data may be sent to the POS terminal to indicate the presence of the items in the shopping cart and add them to the customer's bill.

Figure 3:
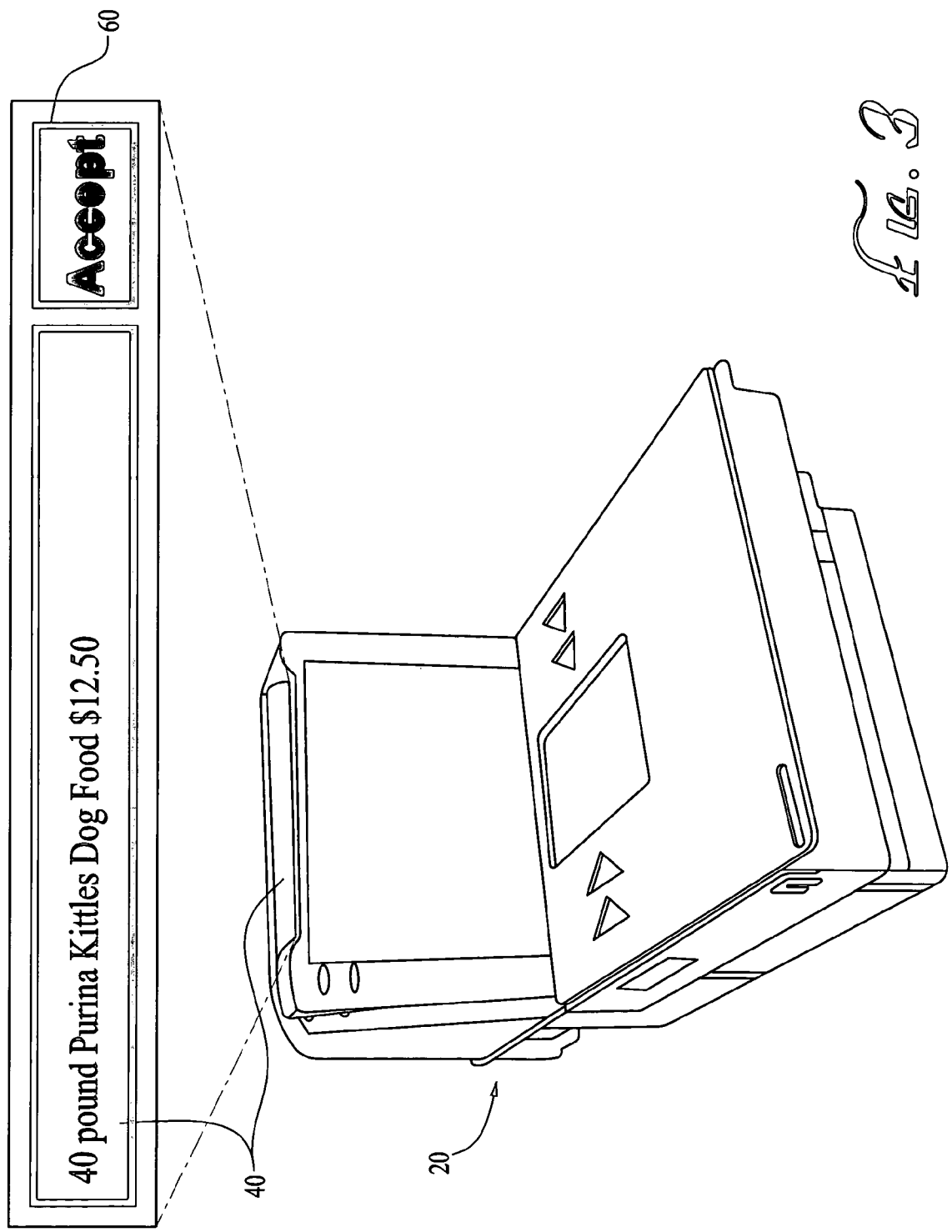
FIG. 3 illustrates a barcode scanner suitable for use in connection with certain preferred embodiments.

In some embodiments, when the BOB item detector 10 informs the scanner 20 of the detection of a BOB item, the scanner may trigger an audio tone, which may be transmitted through audio device 50. The scanner 20 itself may, in some embodiments, be augmented to include an audio device 50. In some embodiments, the scanner 20 may also be configured with a user input device, such as an accept button 60. Upon hearing the audio tone indicating that a BOB item has been detected and/or upon seeing a written description of the item (s) on the display 40, the operator G may then visually confirm that such an item or items are present and transmit such confirmation to the system by pressing the accept button 60. As shown in FIG. 3, an accept button 60 may be included as part of an input device in some embodiments. The scanner 20 in FIG. 3 is illustrated as including a display 40 and an accept button 60. Additional accept buttons or other control switches (not shown) may be provided.

In other embodiments, a camera or other imaging device may be integrated with the detector 10. The display 40 may be used to display an image of the item(s) detected to the operator from the imaging device. In this manner, a operator may visually confirm the presence of the detected item(s) without visually inspecting the shopping cart itself, and then confirm the item's presence by pressing the accept button 60.

Once the operator has provided such feedback via the accept button 60 or another input device, the scanner 20 may then transmit the item UPC barcode value and/or other relevant information to the POS terminal 70, which may include POS display 80 and POS keyboard 90, just as if the detected item were a scanned item. This process may be repeated sequentially for each detected item, or all detected items may be processed simultaneously. As stated above, in certain embodiments, the scanner may be configured to make audible and/or visual signals to the operator each time a BOB item is detected in order to ensure that the operator is made aware of the presence of those items. Any of the structures described herein for providing audible or visual signals to a operator may be considered means for indicating the presence of a bottom-of-basket item.

Once the UPC and/or other information regarding the BOB item(s) has been transmitted to the POS terminal 70, the BOB item(s) may be entered into the store's transaction log on store controller 100.

In some embodiments, to ensure that the operator does not ignore the BOB item(s), the scanner may be disabled from reading further barcodes until the BOB item has been accepted or rejected. In such embodiments, the input device on the scanner 20 may include two buttons, such as an accept button and a separate reject button. To reduce the distraction and productivity loss of having BOB items arrive while the operator is actively scanning products, the BOB scan disable feature can be configured to delay until no item has been scanned for a configurable period of time. Also, if the scanner has been disabled by the POS terminal at the time the BOB item is detected, the scanner may delay reporting the item until it has been enabled, in some cases concurrent with the start of a new transaction.

The scanner may also be configured to collect data on BOB items seen and the cashier decisions made for each item. This data may be stored in the database of BOB items referred to above, or another connected database. In some embodiments, statistics reports can be generated to show trends in BOB item capture over time, by lane, and/or by cashier.

The identity of the cashier on duty may be captured in certain embodiments to enhance the value of the statistics reports. Several means of identifying the cashier are possible, including querying the POS terminal for the cashier logged on, receiving cashier identification from the POS terminal each time it changes, requiring the cashier to scan a special identification barcode at the time of log on and log off, and querying a store database for the cashier logged on to a given lane at a given time.

The terms and descriptions used herein are set forth by way of illustration only and are not meant as limitations. Those skilled in the art will recognize that numerous variations and modifications can be made to the details of the above-described embodiments without departing from the underlying principles of the invention. The scope of the invention should therefore be determined only by the following claims—and their equivalents—in which all terms are to be understood in their broadest reasonable sense unless otherwise indicated.

The invention claimed is:

1. A method for modification of a point-of-sale system to include a bottom-of-basket item detector, the method comprising:
   providing a bottom-of-basket item detector, wherein the bottom-of-basket item detector is configured to detect the presence of one or more items on a lower shelf of a shopping cart without relying on reading encoded symbols on the one or more items; and
   integrating the bottom-of-basket item detector with a point-of-sale system such that product data for the one or more items detected by the bottom-of-basket item detector is transmitted to a data reader operatively connected with the point-of-sale system, wherein the bottom-of-basket item detector is integrated with the point-of-sale system without modification of the point-of-sale system software, and wherein the bottom-of-basket item detector is integrated with the point-of-sale system such that the product data transmitted to the data reader comprises a representation of an encoded symbol in a format that is the same as an encoded symbol format in which the terminal is configured to receive data from the data reader.

2. The method of claim 1, wherein the product data comprises a UPC code.

3. The method of claim 1, wherein the bottom-of-basket item detector is integrated with the point-of-sale system via an ethernet connection.

4. The method of claim 1, wherein the bottom-of-basket item detector is integrated with the point-of-sale system by interfacing the bottom-of-basket item detector with a data reader connected with the point-of-sale system.

5. A method for modification of a point-of-sale system to include a bottom-of-basket item detector, the method comprising:
   providing a bottom-of-basket item detector, wherein the bottom-of-basket item detector is configured to detect the presence of one or more items on a lower shelf of a shopping cart without relying on reading encoded symbols on the one or more items; and
   integrating the bottom-of-basket item detector with a point-of-sale system such that product data for the one or more items detected by the bottom-of-basket item detector is transmitted to the point-of-sale system, wherein the bottom-of-basket item detector is integrated with the point-of-sale system without modification of the point-of-sale system software, and wherein the bottom-of-basket item detector is integrated with the point-of-sale system such that the product data transmitted to the point-of-sale system comprises a representation of an encoded symbol in a format that is the same as an encoded symbol format in which the point-of-sale system is configured to receive data from a data reader operatively connected with the point-of-sale system.

* * * * *